United States Patent [19]

Ouellette

[11] Patent Number: 4,557,656
[45] Date of Patent: Dec. 10, 1985

[54] TOP FEEDING AND EJECTING MATERIALS HANDLING APPARATUS

[76] Inventor: Joseph F. Ouellette, 822 E. Essex, Glendale, Mo. 63122

[21] Appl. No.: 950,280

[22] Filed: Oct. 11, 1978

[51] Int. Cl.[4] .................... B65G 57/03; B65G 59/02
[52] U.S. Cl. .................................. 414/43; 414/100; 414/101; 414/118
[58] Field of Search ............... 414/36, 82, 100, 118, 414/119, 101, 37, 45, 43, 98, 50, 719, 750, 677, 609

[56] References Cited

U.S. PATENT DOCUMENTS

| | | |
|---|---|---|
| 1,095,319 | 5/1914 | Ervin . |
| 1,365,120 | 1/1921 | Myers . |
| 2,005,906 | 6/1935 | Pierce . |
| 2,257,469 | 9/1941 | Keil . |
| 2,315,003 | 3/1943 | Martin et al. . |
| 2,634,852 | 4/1953 | Clauss . |
| 2,699,264 | 1/1955 | Bruce et al. . |
| 2,701,650 | 2/1955 | Stevenson, III . |
| 2,745,561 | 5/1956 | Natkanski ........................ 414/240 |
| 2,774,489 | 12/1956 | Guigas ............................ 414/82 X |
| 2,857,040 | 10/1958 | Campbell . |
| 2,875,907 | 3/1959 | Locke et al. . |
| 2,901,128 | 8/1959 | Barski . |
| 3,056,513 | 10/1962 | Von Gal, Jr. . |
| 3,688,920 | 9/1972 | Frish ................................ 414/45 |
| 3,698,708 | 10/1972 | Brawn ............................ 271/180 |
| 3,844,422 | 10/1974 | Smith et al. .................. 414/98 X |
| 3,954,190 | 5/1976 | Howard et al. ................. 414/45 |
| 3,974,922 | 8/1976 | Selusnik et al. .............. 414/118 |
| 4,058,225 | 11/1977 | Janson ........................ 414/119 X |
| 4,197,046 | 4/1980 | Shanu . |
| 4,214,848 | 7/1980 | Verwey et al. . |

Primary Examiner—Frank E. Werner
Attorney, Agent, or Firm—Rogers, Howell, Renner, Moore & Haferkamp

[57] ABSTRACT

A materials handling device, such as a palletizer and/or depalletizer, which may be adapted to operate in either mode, has a mechanism, for feeding pallets to be loaded and ejecting pallets which have been unloaded, at the top of the device. The pallets are introduced into a bay and placed onto an elevator and sequentially indexed upwards a distance equal to each layer to be unloaded or downward a distance equal to each layer to be loaded. The pallets in the machine are indexed to a standard position. Ejection and introduction of loaded and unloaded pallets is automatically sequenced.

8 Claims, 14 Drawing Figures

TOP FEEDING AND EJECTING MATERIALS HANDLING APPARATUS

BACKGROUND AND SUMMARY OF THE INVENTION

Many small articles, such as beverages, beverage containers, food, small machine parts and other small items, are packaged in pallet load lots. Pallet loads are large stacks of articles or boxes of articles which are held on a flat support or pallet. The pallets may carry bulk items, such as beverage cans, or boxes or cases, each of which contain several items. The pallet and the goods on it can be moved as a unit from manufacture and packaging through distribution and ultimate use of the goods. Pallets are often moved in the distribution system by fork lift trucks which transport the entire pallet from place to place, or by conveyors.

A variety of machines have been devised to load and unload palletized materials, since manual handling is slow and expensive. These devices are known as palletizers or depalletizers by the industry. A typical palletizing machine is described and disclosed in U.S. Pat. No. 3,056,513. Stacking and unstacking devices are also described in U.S. Pat. Nos. 1,095,319; 1,365,120; 2,005,906; 2,257,469; 2,315,003; 2,634,852; 2,699,264; 2,701,650; 2,857,040; 2,875,907; and 2,901,128. The disclosures of all of the above patents are incorporated by reference herein.

The state of the art palletizing and depalletizing machines use a bottom ejecting technique which requires that a pallet be returned to the bottom of the machine and ejected when empty. This introduces a period of dead time into the machine during which no loading or unloading is taking place and slows down the total throughput of the machine. As a result, in many operations, it is necessary to provide some mens to accumulate material in the system so that the other operations in the total system can be continued during the times that the loading or unloading device is cycling pallets in or out of the machine.

For example, in high speed beverage canning operations, bulk cans are unloaded by a depalletizer having a bottom ejecting operation. In order to supply sufficient cans to the canning operation, a long accumulating conveyor is required which has enough lag in it that cans can be continuously fed to the canning machine. These conveyors are quite long, occupy a great deal of expensive space, which could be used for other purposes in the plant, and are expensive to purchase and maintain.

Accumulating conveyors are also required in palletizing operations which have bottom feeding of empty pallets, since time is required to cycle an unloaded pallet up to the ready position after ejection of the loaded pallet. The conveyors provide a lag to hold the flow of materials which is interrupted by the cyclic ejection of a loaded pallet.

Applicant has devised a unique top ejecting and top feeding palletizing and depalletizing machine which can produce considerable savings in the time required to eject unloaded pallets from the machine, in feeding pallets to be loaded into the machine and in the time required to sequence subsequent pallets into the machine for loading and unloading. This device can be used to supply materials, for example cans to a high speed bottling operation, without the necessity for extensive accumulating conveyors since the gaps in the flow of cans, or other materials, are much smaller than the current state of the art devices. This enables the depalletizing machine to be placed much closer to the equipment which will use materials fom the depalletizing machine and saves not only in conveyors, conveyor maintenance cost and in space. The palletizing machine made can be operated much closer to the output machine without the necessity of extensive accumulating conveyors and other anciliary handling devices and in a savings in space due to the greater throughput.

Other and further advantages are apparent from the detailed description of the preferred embodiments which follows and from the drawings.

DESCRIPTION OF THE PREFERRED EMBODIMENT

Figure 1:
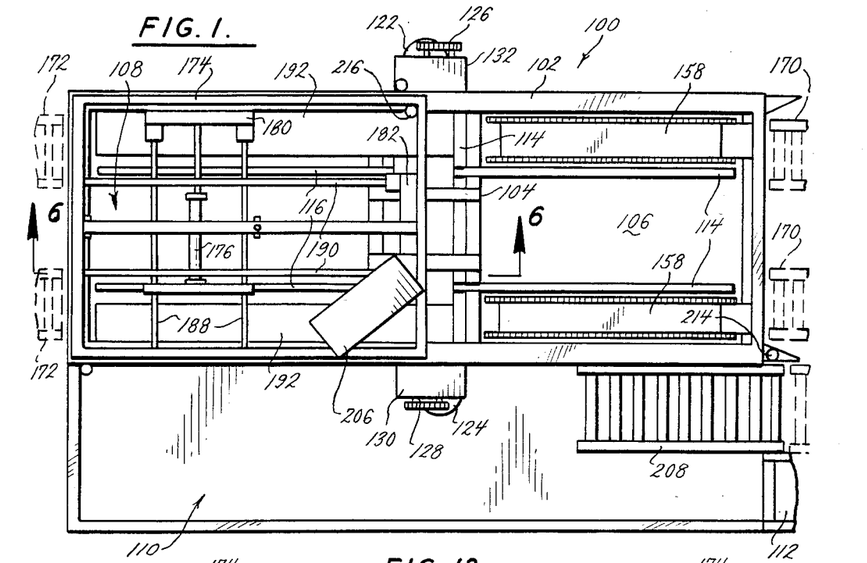
FIG. 1 is a top view of the palletizer-depalletizer showing the loading-unloading and storage bays.
Figure 2:
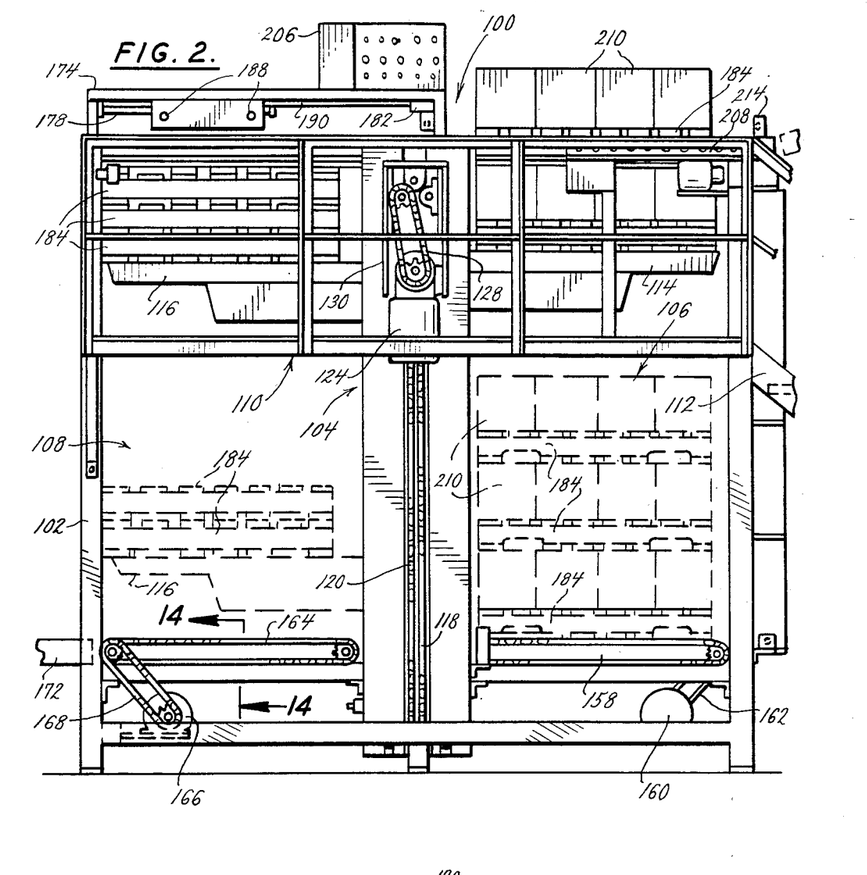
FIG. 2 is a front view of the device of FIG. 1 showing pallets in the storage bays and materials loaded on pallets in the loading-unloading bays.
Figures 3, 4:
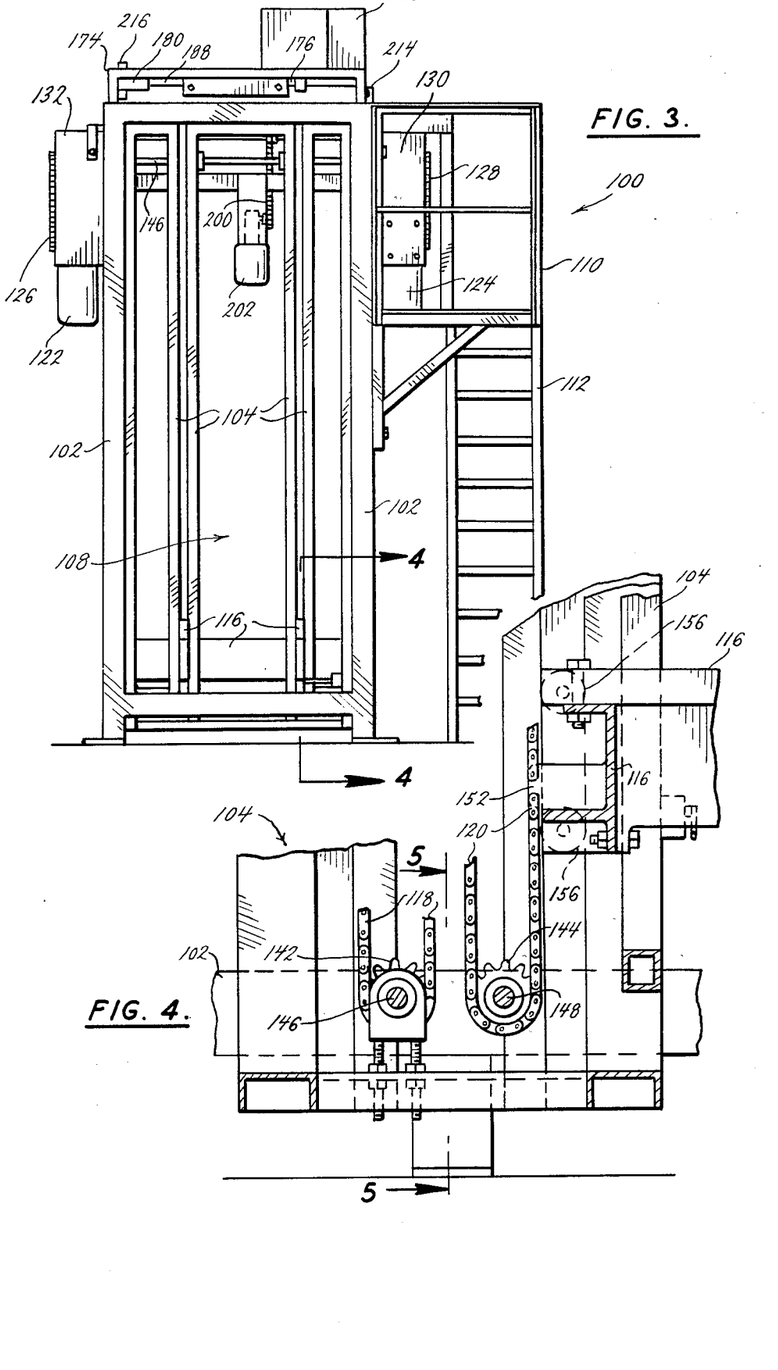
FIG. 3 is an end view of the storage bay of the device shown in FIG. 1.
FIG. 4 is a broken cross-sectional view taken along the plane of line 4—4 of FIG. 3.
Figure 5:
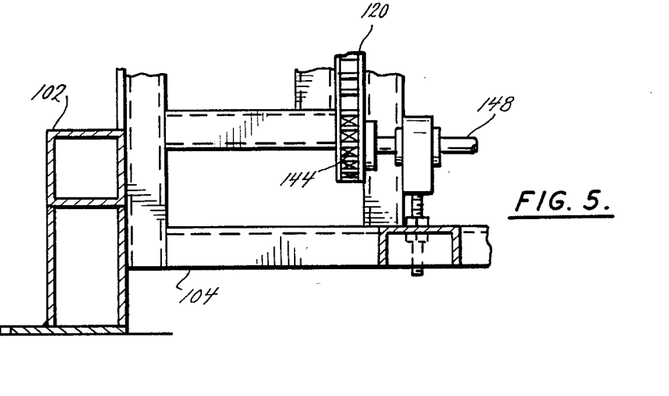
FIG. 5 is a broken cross-sectional view taken along the plane of line 5—5 in FIG. 4.

Referring in more detail to FIGS. 1, 2 and 3, the palletizer-depalletizer 100 is shown. The machine has a frame 102, shown formed of square tubes. The frame 102 is formed with a center beam portion 104, a loading-unloading bay 106 and a storage bay 108. For convenience the palletizer-depalletizer 100 will be referred to as a depalletizer, but it will be appreciated that it can perform both functions. The loading-unloading bay 106 will be for convenience called the unloading bay, but it will be appreciated that it can also perform both of those functions.

The depalletizer 100 has a scaffold 110 mounted on one side of the machine at the top. The scaffold can be reached by stairs 112. Scaffold 110 and stairs 112 may be welded on the machine, but they can also be attached by bolts so that they can conveniently be placed on either side of the depalletizer 100 as the layout of the particular plant requires. The scaffold 110 and stairs 112 may even be changed, if the depalletizer 100 is moved to a different location or the process flow around it is changed.

Figures 6, 7, 8:
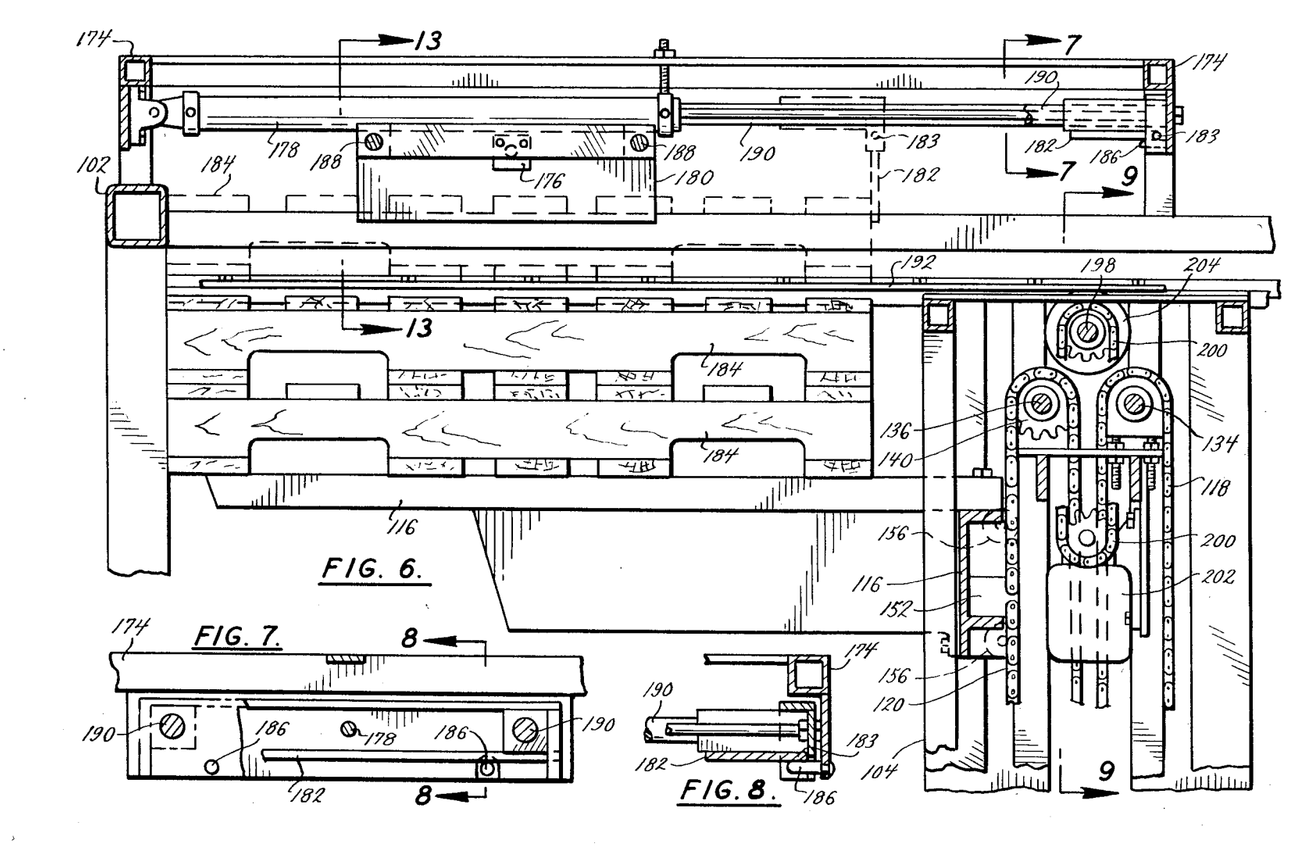
FIG. 6 is a broken cross-sectional view taken along the plane of line 6—6 in FIG. 1.
FIG. 7 is a broken cross-sectional view taken along the plane of line 7—7 in FIG. 6.
FIG. 8 is a broken cross-sectional view taken along the plane of line 8—8 in FIG. 7.
Figure 9:
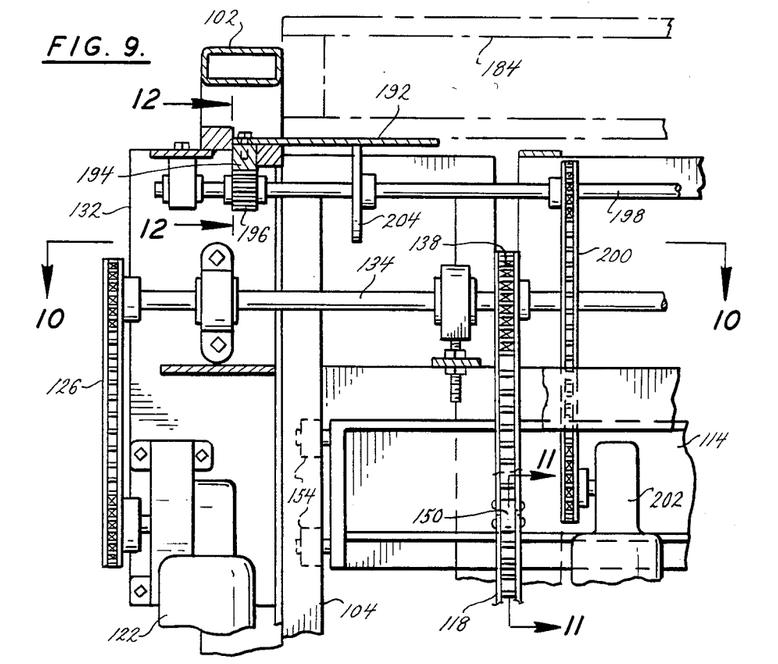
FIG. 9 is a broken cross-sectional view taken along the plane of line 9—9 in FIG. 6.
Figures 10, 11:
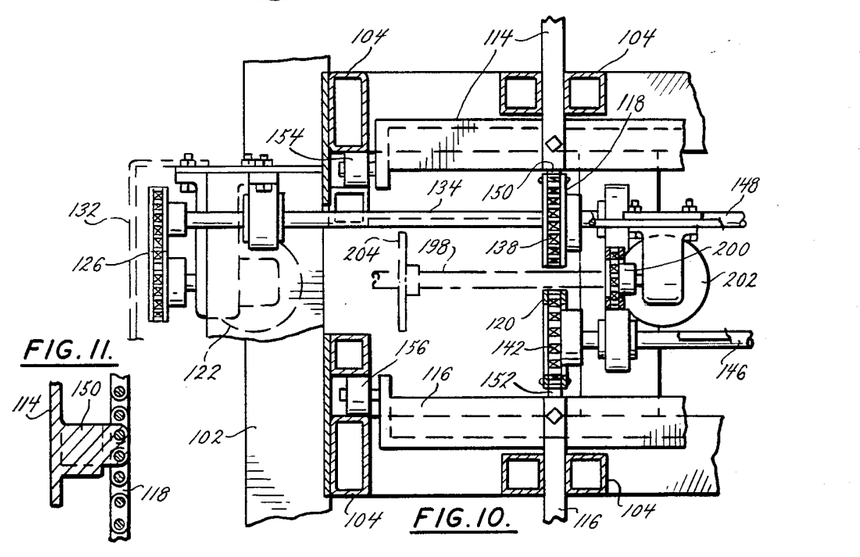
FIG. 10 is a broken cross-sectional view taken along the plane of line 10—10 in FIG. 9.
FIG. 11 is a broken cross-sectional view taken along the plane of line 11—11 in FIG. 9.

In the unloading bay 106 is a twin blade cantilevered elevator 114 and in the storage bay 108 is a similar twin blade cantilevered elevator 116. The elevators are raised and lowered by parallel double lift sets 118 and 120. One chain lift from each of sets 118 and 120 is shown in FIG. 6. The chain lift sets 118 and 120 are housed in the center beam portion 104 of the depalletizer 100. The blades of cantilevered elevators 114 and 116 extend through the slots of the center beam portion 104 into the unloading bay 106 and the storage bay 108, as shown in FIG. 10. It will be appreciated that other elevator means, such as hydraulic driven lifts or center hydraulic pistons, may be used instead of the cantilevered chain lifted elevators as shown. The chain sets 118 and 120 are driven by motors 122 and 124 acting through suitable chain driven gear sets 126 and 128 and provided with suitable safety covering 130 and 132, as shown. Chain and gear sets 126 and 128 drive rotating shafts 134 and 136 which extend into the center beam portion and have paired gear sets 138 and 140 which drive elevator chain sets 118 and 120. The paired elevator chains 118 and 120 extend downwardly in the center of the depalletizer 100 and pass around idler gear sets 142 and 144. Gear sets 142 and 144 are attached to rotating shafts 146 and 148 which are journaled at the bottom in the center of the depalletizer 100, as shown in FIG. 4. The parallel chain sets 118 are fastened to the back of elevator 114 at bosses 150. See FIGS. 9, 10 and 11. The parallel chain sets 120 are fastened to the back of elevator 116 by similar bosses 152. See FIGS. 6 and 10. The outer edges of elevator 114 are provided with support rollers 154 and the outer edges of elevator 116 are provided with similar rollers 156. Rollers 154 and 156 ride against elements of the frame center beam portions 104, as shown, to guide and support the elevators 114 and 116 as they are raised and lowered by motors 122 and 124.

Unloading bin 106 has a input conveyor 158 which is driven by motor 160 and chain and gear set 162. Storage bay 108 similarly has an outlet conveyor 164 driven by motor 166 and chain and gear set 168. Associated with unloading bay 106 is an input conveyor 170 which may be of the driven or gravity feed type. Storage bay 108 similarly has a conveyor 172 which may be driven or gravity operated. Both conveyors 172 and 170 may be of the accumulating type having space for one or more pallets or stacks of pallets.

Above storage bay 108 is a sub-frame 174 in which is mounted a transversely extending cylinder and piston 176 and a longitudinally extending cylinder and piston 178. These pistons may be either pneumatically or hydraulically operated by suitable valving, not shown. Transversely extending cylinder and piston 176 operates plow 180 reciprocally across the top of the storage bay 180, as shown, cylinder and piston 178 operates plow 182 reciprocally and longitudinally across the top of storage bay 108, also as shown.

Plows 180 and 182 position ejected pallets 184 for stacking on elevator 116. When plow 182 is retracted to the extreme position, shown to the far right in FIG. 6, it is folded about a hinge 183, to the position shown in FIG. 7, by stationary pins 186 which impinge on the bottom of plow 182, see FIG. 8. Plows 182 and 180 are operated by their respective cylinders and pistons on sliding guides 188 and 190, as shown.

Figures 12, 13, 14:
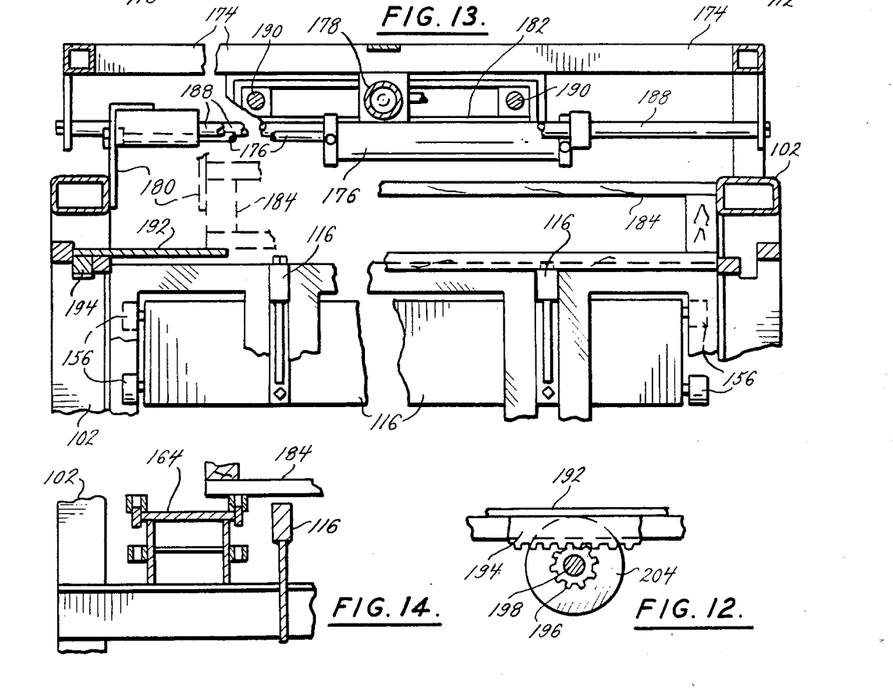
FIG. 12 is a broken cross-sectional view taken along the plane of line 12—12 in FIG. 9.
FIG. 13 is a broken cross-sectional view of the unloaded pallet indexing apparatus taken along the plane of line 13—13 in FIG. 6.
FIG. 14 is a broken cross-sectional view taken along the plane of line 14–in FIG. 2.

At the top of depalletizer 100 are two longitudinally operating carriage plates 192, as shown each having a rack 194, as shown in FIG. 12. Each rack 194 meshes with pinion gears 196 which are mounted on a shaft 198 which extends transversely in the center beam portion 104 at the top of the depalletizer 100. Shaft 198 is rotated by gear and chain set 200 which is driven by motor 202 mounted in the center beam portion 104 of the depalletizer 100. Shaft 198 also carries a pair of rotating supports 204 which serve as bearing surfaces on which carriage 192 can rest as it reciprocates longitudinally in the depalletizer 100 when driven by motor 202.

Depalletizer 100 has a control box and panel 206 at the top of sub-frame 174 and accessible to an operator on scaffold 110. Control panel 206 contains the switches by which the various operations of the machine, described herein, may be controlled manually. The operations may also be controlled semi-automatically by conventional relay and switching logic or by integrated circuitry. A master control panel, not shown, may contain all of the logic and a second set of activating switches. The master panel is positioned anywhere convenient on the machine or separately from the machine.

The depalletizer 100 also has an associated conveyor 208 at the top of the device for conveying away for further use of the materials which are unloaded from the pallets 184.

OPERATION OF THE DEVICE

Depalletizing

When operated as a depalletizer, for example to unload pallets of cardboard boxes 210 containing goods such as new beverage bottles, input conveyor 170 may be a powered accumulating conveyor which is sized to accumulate two or more pallet loads upstream of the unloading bay 106. When elevator 114 is in its lowermost position, it activates a micro-switch, not shown, to energize input conveyor 170 and unloading bay conveyor 158 to load a pallet 184 fully into the unloading bay 106. When a pallet 184 is fully loaded into the input bay 106 above elevator 114 it activates a micro-switch or photocell, not shown, to stop conveyors 158 and 170 and to activate motor 122 which drives chain and gear set 126, rotates shaft 134 and lifts elevator 114 through the operation of rotating gears 138 and chain lifts 118. Elevator 114 is indexed upwardly by motor 122 until the top layer or tier of boxes 210 is slightly above, approximately 1 centimeter the top edge of the depalletizer 100 and above the upper surface of the output conveyor 208. In FIG. 2 pallets 184 are shown as having single layers of boxes 210, but it will be appreciated that usually each pallet 184 will contain multiple tiers of boxes 210 rather than single tiers as shown.

With the pallet 184 in the raised position and the boxes 210 spaced slightly above the top of the depalletizer 100 and conveyor 208, the boxes 210 can be removed and placed on the output conveyor 208 and taken to subsequent processing in the plant. When the last box 210 has been removed from the top tier on pallet 184 its absence is detected by a photosensor set 214, 216. As shown, the last carton on the pallet 210 will normally be in the corner of the unloading bay 106 nearest sensor 216. The sensor 216 energizes motor 122 which indexes the next tier or layer into position for removal. Sensor set 214, 216 stops the elevator 114 at the proper location by sensing the presence of the next tier. This process is continued until the last tier or layer on the elevator 114 is reached. At this point a micro-switch, not shown, which responds to the travel of the elevator indexes the elevator upwardly an additional increment, 3 centimeters so that the pallet 184 is spaced above the location in unloading bay 106 which is occupied by carriage 192 when it is placed above the unloading bay 106. This switch, with a suitable time delay, energizes motor 202 driving carriage 192 longitudinally across the top of depalletizer 100 into position above loading bay 106 and below the pallet 184. When carriage 192 reaches the limit of its travel into unloading bay 106 a micro-switch, not shown, activates motor 122 which lowers elevator 114 allowing pallet 184 to rest on transverse carriage 192.

Elevator 114 continues to be lowered to the bottom limit of its travel and a second pallet load of material is indexed into the machine from conveyors 170 by conveyor 158 as previously described. When the second pallet is in position above elevator 114 the previously described micro-switch activates motor 122 which raises that pallet upwardly to a ready position just beneath the pallet which is resting on transverse carriage 192. Normally this would be about 8 centimeters below the position of carriage 192 in bay 106. When the last box 210 has been removed from the pallet 184 which is resting on carriage 192, the photocell sensors set 214 and 216 and the micro-switch associated with carriage 192 energize motor 202 to move carriage 192 and to transport the pallet 184 from unloading bay 106 to the storage bay 108. When carriage 192 clears unloading bay 106 the motor 122 is again energized to raise elevator 114 and position the top tier of the new pallet load of material in position for unloading. The unloading sequence then is repeated as previously explained.

As the transverse carriage 192 moves into storage bay 108 the pallet 184 carried thereon moves beneath plow 182 which is in position pivoted about hinge pin 183. When the carriage 192 reaches the limit of its travel into bay 108 it activates a micro-switch, not shown, which stops motor 202 and activates a suitable valve, not shown, for pneumatic or hydraulic valving of longitudinal cylinder and piston 178, which moves plow 182 longitudinally into engagement with pallet 184 and pushes the pallet 184 to a position contacting the frame 102 at the extreme edge of the depalletizer 100 as shown in FIG. 6. When pallet 184 reaches the extreme edge, it stops cylinder and piston 178 and activates transverse cylinder and piston 176 which moves plow 180 transversely across depalletizer 100 to engage the edge of the pallet 184 and index it against the frame 102 of depalletizer 100 nearest the scaffold, as shown in FIG. 1. Elevator 116 has previously been indexed upwardly to a position slightly below the position of carriage 192. Normally this position would be approximately three cm. below the pallet itself.

When the last tier of the second pallet to be unloaded is reached, the elevator 114 again indexes that pallet above the position of carriage 192 in bay 106. Carriage 192 is then activated, as previously described, and is driven by motor 202 longitudinally in depalletizer 100 and into position in bay 106 below the pallet 184. As the carriage 192 leaves bay 108 it drops the first pallet onto elevator 116 in bay 108. Elevator 116 is then indexed downwardly by suitable switching means, not shown, so that the pallet on the elevator 116 is below the position of the carriage 192 in bay 108 and, preferably, is then indexed upwardly in response to suitably placed switch means, not shown, so that the stacked pallet is in a ready position with the top of the pallet being approximately three centimeters below the position of carriage 192 in bay 108. The stacked pallet is then ready to receive the next unloaded pallet. When elevator 116 has accumulated sufficient pallets, suitable switch means, not shown, associated with elevator 116 activates motor 124 to index the elevator down an additional distance and rest the pallet load on output conveyor 164. Switching means, not shown, then activates the motor 166 which ejects the pallet load to output conveyor 172.

The above description has shown the input and output to the depalletizer in a longitudinal mode. It will be appreciated, particularly from viewing FIG. 2, that pallets could also be introduced and removed from the depalletizer transversely by changing the directions of conveyors 162 and 164, 170 and 172. Fork lift trucks can be used from any direction. The particular mode will depend upon the design and layout of the particular process and plant served by the depalletizer 100. It will also be appreciated that safety plates and screens are not shown on the device, they would normally be used to cover the areas of the machine which were not being used to transport materials through the device. It will also be appreciated that the arrangement of conveyor 208 can be changed as the layout of the plant dictates and can be located at either side of the machine or at the end.

By using the process described above lag time is reduced to a minimum. The loading and unloading process is continuous and keeps subsequent pallet loads at the ready position. There is very little time lost in indexing spent pallets out of the machine or introducing new loads into the machine. The transverse carriage 192, the elevators 114, 116 are free, when the last tier of the pallet is reached to move down and pick up subsequent pallets for unloading or loading, as is not possible with bottom ejecting machines.

Palletizing

The same convenience is found when the machine is operated in the palletizing mode by reversing the operation of the device. In the palletizing mode a load of pallets 184 is introduced to the storage bay 108 and indexed sequentially upwardly as the pallets are required. Plows 180 and 182 properly index the pallets, a feature which allows a variety of pallets to be used without resetting the machine, in both the palletizing and depalletizing modes. The pallets are fed to the loading bay 106 by operation of the transverse carriage 192 where they are positioned on elevator 114. As the pallets are loaded the elevator is indexed down until the load has been completed and the pallet is ejected by the operation of conveyors 158 and 170. When the pallet has been positioned on elevator 114 transverse carriage 192 returns to the storage bay 108 and engages a second pallet which has been readied by the operation of elevator 116 indexing upward and has been indexed by plows 180 and 182 which position the pallet for subsequent transportation into the loading bay 106. Loading of the second pallet can commence before expulsion of the first loaded pallet is completed. It will be appreciated that this also eliminates the dead time necessary for the elevator 114 to eject a loaded pallet, load an empty pallet and cycle upwardly to the loading position.

While the operation has been described here as semi-automatic, the operation of motors 122 and 124 and 202, which sequence the elevators 114 and 116 and carriage 192 and conveyor motors 160, 166 could be controlled manually by an operator on the scaffold 110 switching the motor controls through use of control panel 206.

In the foregoing specification I set forth the embodiments described herein for the purpose of illustration, but it is to be understood that such details may be varied widely by those skilled in the art without departing from the spirit and scope of the invention.

I claim:

1. A materials handling device having a frame, means forming a bay in the frame for receiving pallets, the bay having conveying means cooperating therewith for transporting pallets into or out of the bay and an elevator for vertically transporting pallets in the bay, the device having a transversely movable plate means adjacent to the top of the bay for supporting a pallet in position at the top of the bay during a portion of continued operations when the elevator is sequenced down and for transversely transporting a pallet.

2. A materials handling device having a frame, means forming a bay in the frame for receiving a loaded pallet, conveying means for introducing a loaded pallet into the bay, an elevator in the bay for lifting a loaded pallet and means to sequence the elevator up in steps for unloading layers of material off of the pallet, the device having transversely movable plate means to support a pallet in position substantially at the top of the bay, and means to sequence the elevator in the bay to introduce and ready a subsequent pallet to be unloaded at a position adjacent to the support means prior to completion of unloading of an initial pallet, and the plate means ejecting an unloaded pallet from the bay.

3. A materials handling device having a frame, means forming a bay in the frame for receiving a loaded pallet, conveying means for introducing a loaded pallet into the bay, an elevator for lifting a loaded pallet and means to sequence the elevator in steps for unloading layers of material off of the pallet, the device having a transverse carriage means movable in the bay to support a pallet in position to be unloaded, the carriage means being movable to eject an unloaded pallet from the bay, the device having means to expel the ejected pallet from the device during continued operation in unloading a subsequent pallet, the device having means to sequence the elevator and ready a subsequent pallet to be unloaded to a ready position adjacent to an initial pallet supported on the carriage means during continued unloading of an initial pallet supported on the carriage means.

4. The device of claim 3 wherein the transverse carriage means is a pair of parallel horizontal plates spaced on opposite sides of the frame, the plates being transversely movable into and out of the bay, the device having means to sequence the elevator to position a pallet thereto at a location in the bay above the location of the plates in the bay, the plates having means providing a support in the bay for the pallet when the elevator is sequenced down, the plates also providing means to remove a pallet supported thereon from the bay when the plates are moved out of the bay.

5. A materials handling device having a frame, means forming a bay in the frame for loading a pallet, conveying means for conducting a loaded pallet from the bay, an elevator for supporting a pallet in the bay and means to sequence the elevator in steps for loading layers of material onto the pallet, the device having a transverse carriage means movable in the bay to support a pallet in position to be loaded, the carriage means being movable to introduce an unloaded pallet into the bay, the carriage means having means to ready a second unloaded pallet to be introduced into the bay prior to completion of loading of an initial pallet, the device having means to sequence the elevator down to eject the initial loaded pallet, the carriage means having means to introduce and support the second pallet to at least partially load the second pallet during ejection of the initial pallet.

6. The device of claim 5 wherein the transverse carriage means is a pair of parallel horizontal plates spaced on opposite sides of the frame, the plates being transversely movable into and out of the bay, the plates having means to support and ready a second pallet to be loaded at a position adjacent to the bay, the plates also providing means to introduce the second pallet into the bay when the plates are moved transversely into the bay, and the plates providing means to support the second pallet for at least partial loading during operation of the elevator down in the bay to eject an initial loaded pallet.

7. A material handling device having a frame, means forming an unloading bay in the frame for receiving a loaded pallet having material supported thereon, the device also having means forming a storage position for supporting an unloaded pallet, and a material output conveyor, the device having a chain lift and an elevator attached thereto in the unloading bay; the device having means to convey a loaded pallet into the unloading bay and means to convey an unloaded pallet out of the storage position; the elevator and chain lift being activated by a motor and gear means; the elevator and motor means being responsive to switch means to index the elevator, once a pallet has been loaded thereon, to a position at the top of the device for unloading the material thereon onto the material output conveyor; the motor and elevator means being responsive to switch means on removal of the last article from a tier of an unloading pallet to index the elevator upwards to station the next tier on the pallet in an unloading position and responsive to switch means to detect the presence of the last tier on the pallet to index the pallet upwardly an additional distance above the unloading station; the device having a transverse carriage means movable into a supporting relationship with the pallet in the unloading bay in response to the positioning of the pallet therein; the elevator and motor means being responsive to switch means to sequence the elevator to its bottom position; the device having means responsive to switch means to load a new loaded pallet on the elevator for unloading thereof, the elevator being responsive to switch means to then raise the new loaded pallet to a ready position beneath the first pallet; the transverse carriage having means to reciprocate the transverse carriage longitudinally, the transverse carriage having means responsive to switch means to transport a pallet supported thereon to the top of the storage position.

8. A material handling device having a frame, means forming an unloading bay in the frame for receiving a loaded pallet having material supported thereon, the device also having a storage bay, a central beam portion and a material output conveyor, the central beam portion housing a first chain lift and an elevator attached thereto cantilevered into the unloading bay; the central beam portion also housing a second chain lift and a second elevator attached thereto cantilevered into the storage bay; the unloading bay having means to convey a loaded pallet into that bay and the storage bay having means to convey an unloaded pallet out of the storage bay; the first elevator and chain lift being activated by a first motor and gear means and the second elevator and chain lift being activated by a second motor and gear means; the first elevator and motor means being responsive to switch means to index the first elevator, once a pallet has been loaded thereon, to a position at the top of the device for unloading the material thereon onto the material output conveyor; the first motor and elevator means being responsive to switch means on removal of the last article from a tier of an unloading pallet to index the elevator upwards to station the next tier on the pallet in an unloading position and responsive to switch means to detect the presence of the last tier on the pallet to index the pallet upwardly an additional distance above the unloading position, the device having a transverse carriage means movable into a supporting relationship with the pallet in the unloading bay in response to the positioning of the pallet therein; the first elevator and motor means being responsive to switch means to sequence the first elevator to its bottom position; the device having means responsive to switch means to load a new loaded pallet on the first elevator for unloading thereof, the first elevator being responsive to switch means to then raise the new loaded pallet to a ready position beneath the first pallet; the transverse carriage means having a motor and chain gear means driving a pinion gear, the pinion gear engaging a rack at the bottom of the transverse carriage means to reciprocate the transverse carriage means longitudinally, the transverse carriage means and its motor being responsive to switch means to transport a pallet supported thereon to the top of the storage bay; the device having a fluid cylinder activated plow means above the storage bay to index and position an ejected pallet in response to switch means responsive to movement of the transverse carriage; the device having means to position the second elevator in the storage bay to stack an ejected pallet thereon in response to switch means responsive to movement of the transverse carriage; the second elevator being responsive to switch means to move to a new ready position below the position in the storage bay of the transverse carriage; the second elevator having means associated therewith to activate the means in the storage bay to convey the stacked ejected pallets from the storage bay.

* * * * *

REEXAMINATION CERTIFICATE (1176th)
United States Patent [19]
Ouellette

[11] B1 4,557,656
[45] Certificate Issued. Dec. 19, 1989

[54] TOP FEEDING AND EJECTING MATERIALS HANDLING APPARATUS

[75] Inventor: Joseph F. Ouellette, Glendale, Mo.

[73] Assignee: Ouellette Machinery Systems Inc., Fenton, Mo.

Reexamination Request:
No. 90/001,552, Jul. 14, 1988

Reexamination Certificate for:
Patent No.: 4,557,656
Issued: Dec. 10, 1985
Appl. No.: 950,280
Filed: Oct. 11, 1978

[51] Int. Cl.⁴ .................. B65G 60/00; B65G 57/03; B65G 59/02
[52] U.S. Cl. .................. 414/790.8; 414/789.9; 414/796.7; 414/795.8; 414/796.2; 414/799; 414/793.4; 414/928; 414/924
[58] Field of Search .............. 414/749, 750, 677, 609, 414/789.1, 789.9, 789, 793.4, 794.2, 790.4, 796.7, 795.8, 796.8, 796.2, 796.6, 799, 797, 788.8, 795.3, 790, 790.1, 788.1, 790.8, 790.7, 788, 796.5, 788.4, 790.2, 792.6, 792.7, 743.5, 794.3, 923, 924, 925, 926, 927, 928

[56] References Cited
U.S. PATENT DOCUMENTS

| | | |
|---|---|---|
| 2,745,561 | 5/1956 | Natkanski . |
| 2,815,870 | 12/1957 | Laub, III . |
| 3,402,830 | 9/1968 | Copping et al. . |
| 3,844,422 | 10/1974 | Smith et al. . |
| 3,954,190 | 5/1976 | Howard et al. . |
| 4,058,225 | 11/1977 | Janson . |

*Primary Examiner*—Frank E. Werner

[57] ABSTRACT

A materials handling device, such as a palletizer and/or depalletizer, which may be adapted to operate in either mode, has a mechanism, for feeding pallets to be loaded and ejecting pallets which have been unloaded, at the top of the device. The pallets are introduced into a bay and placed onto an elevator and sequentially indexed upwards a distance equal to each layer to be unloaded or downward a distance equal to each layer to be loaded. The pallets in the machine are indexed to a standard position. Ejection and introduction of loaded and unloaded pallets is automatically sequenced.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-8 is confirmed.

Claim 1 is cancelled.

New claims 9-12 are added and determined to be patentable.

9. *A materials handling device having a frame, means forming a bay in the frame for loading a pallet,*
*conveying means for conducting a loaded pallet from the bay,*
*an elevator for supporting a pallet in the bay for vertical movement between an elevated position where the elevator can receive a first pallet to be loaded and a lower position where the elevator can discharge a loaded first pallet,*
*means for sequencing the elevator downwardly in steps as successive layers of product are deposited on the first pallet,*
*transverse carriage means including transfer plate means supported for transverse movement of the transverse carriage means and transfer plate means between a ready position laterally adjacent the path of vertical movement of the elevator and a loading position aligned with the path of vertical movement of the elevator,*
*whereby when the transfer plate means is in the ready position a second pallet can be supported on the transfer plate means during loading of the first pallet while the first pallet is on the elevator, and when the transfer plate means is moved to the loading position it can support the second pallet to be at least partially loaded,*
*means to sequence the elevator down to eject the first loaded pallet,*
*moving means for moving the transverse carriage means including the transfer plate means from the ready position to the loading position for introduction and support in the bay of an unloaded second pallet in the bay and for at least partial loading of the second pallet during ejection of the first pallet following completion of loading of the first pallet and prior to return of the elevator to the elevated position where it replaces the transfer plate means as support for the second pallet for continued loading of the second pallet,*
*whereby the moving means can return the transverse carriage means including the transfer plate means from the loading position to the ready position for receiving a third pallet and the device can repeat its cycle of operation.*

10. *The materials handling device of claim 9 wherein:*
*the transfer plate means comprises plate sections,*
*the plate elevator comprises horizontal pallet support means,*
*the plate sections being positioned to avoid interference with the horizontal pallet support means when the elevator is raised to position the horizontal pallet support means above the plate sections and when the transfer plate means is in the loading position,*
*said sequencing means being operable for raising the elevator to the last-named position.*

11. *The materials handling device of claim 9 wherein:*
*the elevator comprises horizontal pallet support means,*
*the transfer plate means and the horizontal pallet support means being positioned to avoid mutual interference when the elevator is raised to position the horizontal pallet support means above the transfer plate means and when the transfer plate means is in the loading position,*
*said sequencing means being operable for raising the elevator to the last-named position.*

12. *A materials handling device having a frame,*
*means forming a bay in the frame for receiving pallets,*
*the bay having conveying means cooperating therewith for transporting pallets into or out of the bay and an elevator for vertically transporting pallets in the bay between elevated and down positions,*
*the device having a transversely movable plate means adjacent to the top of the bay for supporting a pallet on an upper surface of the plate means in a loading position at the top of and in the space defined by the bay during a portion of continued operations when the elevator is sequenced down, whereby the pallet is supported on an upper surface of the plate means during initial loading of the pallet, and for transversely transporting and supporting a pallet on an upper surface thereof to the loading position from a ready position laterally adjacent the bay,*
*means for moving the plate means transversely between the ready position and the loading position,*
*and means for transferring the partially loaded pallet from the plate means while in the bay to the elevator after return of the elevator from the down position to the elevated position to enable continued loading of the pallet while the pallet is supported by the elevator.*

* * * * *